United States Patent
Marumori et al.

(10) Patent No.: US 7,391,964 B2
(45) Date of Patent: Jun. 24, 2008

(54) INFORMATION RECORDING APPARATUS AND INFORMATION RECORDING METHOD

(75) Inventors: Hiroyuki Marumori, Yokohama (JP); Morio Aoki, Hitachinaka (JP); Hiroyuki Tarumizu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1116 days.

(21) Appl. No.: 10/273,104

(22) Filed: Oct. 16, 2002

(65) Prior Publication Data
US 2003/0190160 A1  Oct. 9, 2003

(30) Foreign Application Priority Data
Apr. 4, 2002  (JP) .............................. 2002-102018

(51) Int. Cl.
H04N 5/00 (2006.01)
H04N 5/91 (2006.01)
H04N 7/26 (2006.01)
H04N 13/225 (2006.01)
H04N 9/64 (2006.01)
H04N 7/173 (2006.01)
G11B 7/28 (2006.01)

(52) U.S. Cl. .......................... 386/126; 386/69; 386/104; 386/124; 386/125; 348/335; 348/714; 369/85; 725/134; 725/142

(58) Field of Classification Search ................ 348/335, 348/714; 369/85; 386/69, 70, 96, 104, 105, 386/106, 124, 125, 126; 725/134, 142
See application file for complete search history.

(56) References Cited

U.S. PATENT DOCUMENTS

| 4,224,644 | A | * | 9/1980 | Lewis et al. ................. 360/72.2 |
| 5,274,457 | A | * | 12/1993 | Kobayashi et al. ........ 348/231.9 |
| 5,371,551 | A | * | 12/1994 | Logan et al. ................. 348/571 |
| 5,511,054 | A | * | 4/1996 | Oishi et al. ............... 369/59.27 |
| 5,687,160 | A | * | 11/1997 | Aotake et al. ............. 369/275.3 |
| 5,745,459 | A | | 4/1998 | Inokuchi et al. |
| 6,072,936 | A | * | 6/2000 | Koyama ....................... 386/95 |
| 6,493,506 | B1 | * | 12/2002 | Schoner et al. ............. 386/126 |
| 6,628,591 | B1 | * | 9/2003 | Yokota et al. ............. 369/53.21 |
| 6,731,863 | B2 | * | 5/2004 | Ando et al. .................... 386/95 |
| 6,765,850 | B2 | * | 7/2004 | Shiozawa et al. ......... 369/47.52 |
| 2001/0005223 | A1 | | 6/2001 | Tsunoda et al. |
| 2002/0034141 | A1 | | 3/2002 | Kaku |

FOREIGN PATENT DOCUMENTS

JP   08-125961   5/1996

* cited by examiner

*Primary Examiner*—Thai Q. Tran
*Assistant Examiner*—Syed Y. Hasan
(74) *Attorney, Agent, or Firm*—Townsend and Townsend and Crew LLP

(57) ABSTRACT

An information recording apparatus includes a recording medium receiver to receive a recording medium whereon information may be recorded by the apparatus and a nonvolatile memory to store management information about the recording medium provided in the recording medium receiver. The management information provides information about whether or not data can be recorded on the recording medium.

19 Claims, 5 Drawing Sheets

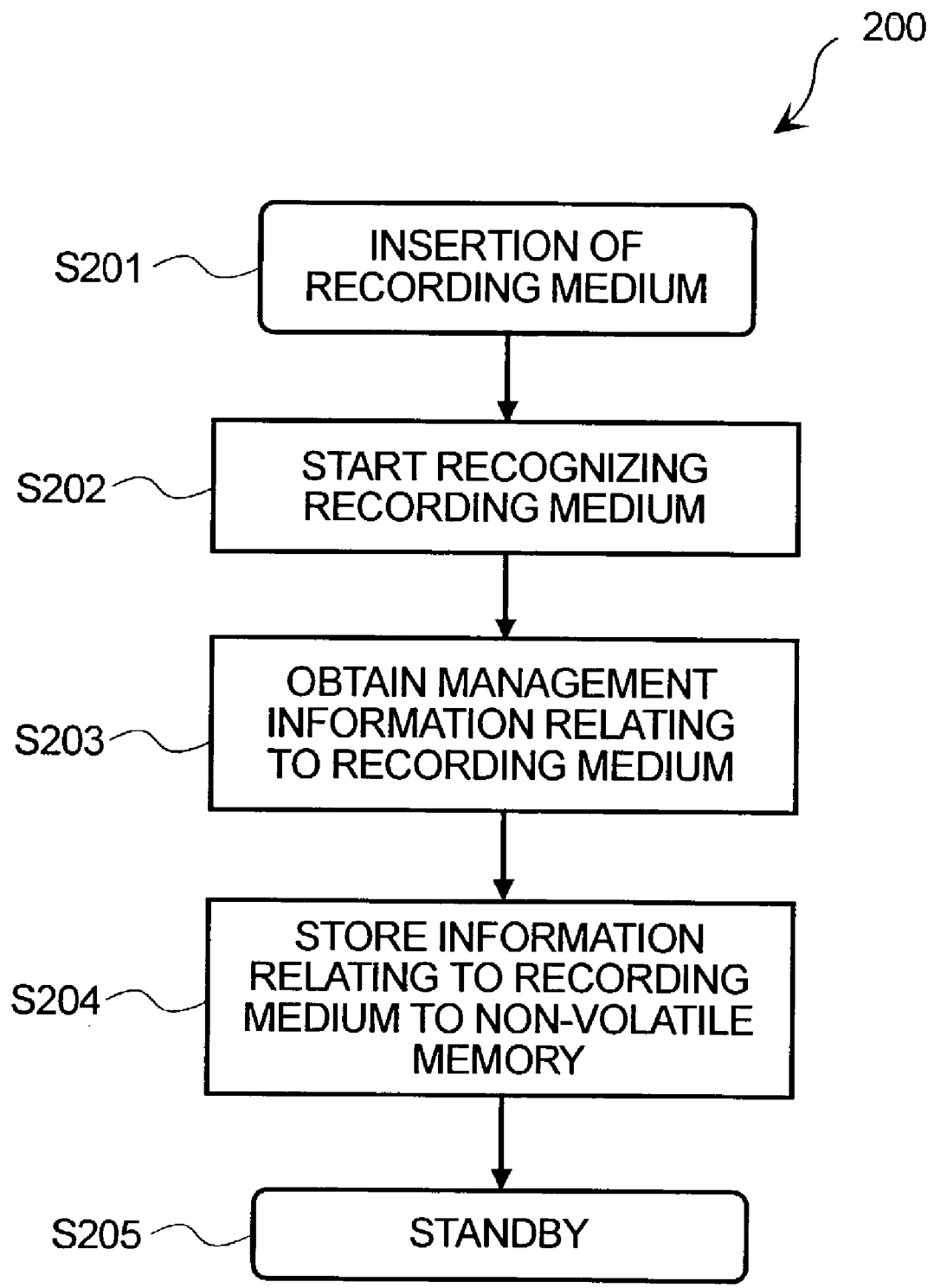

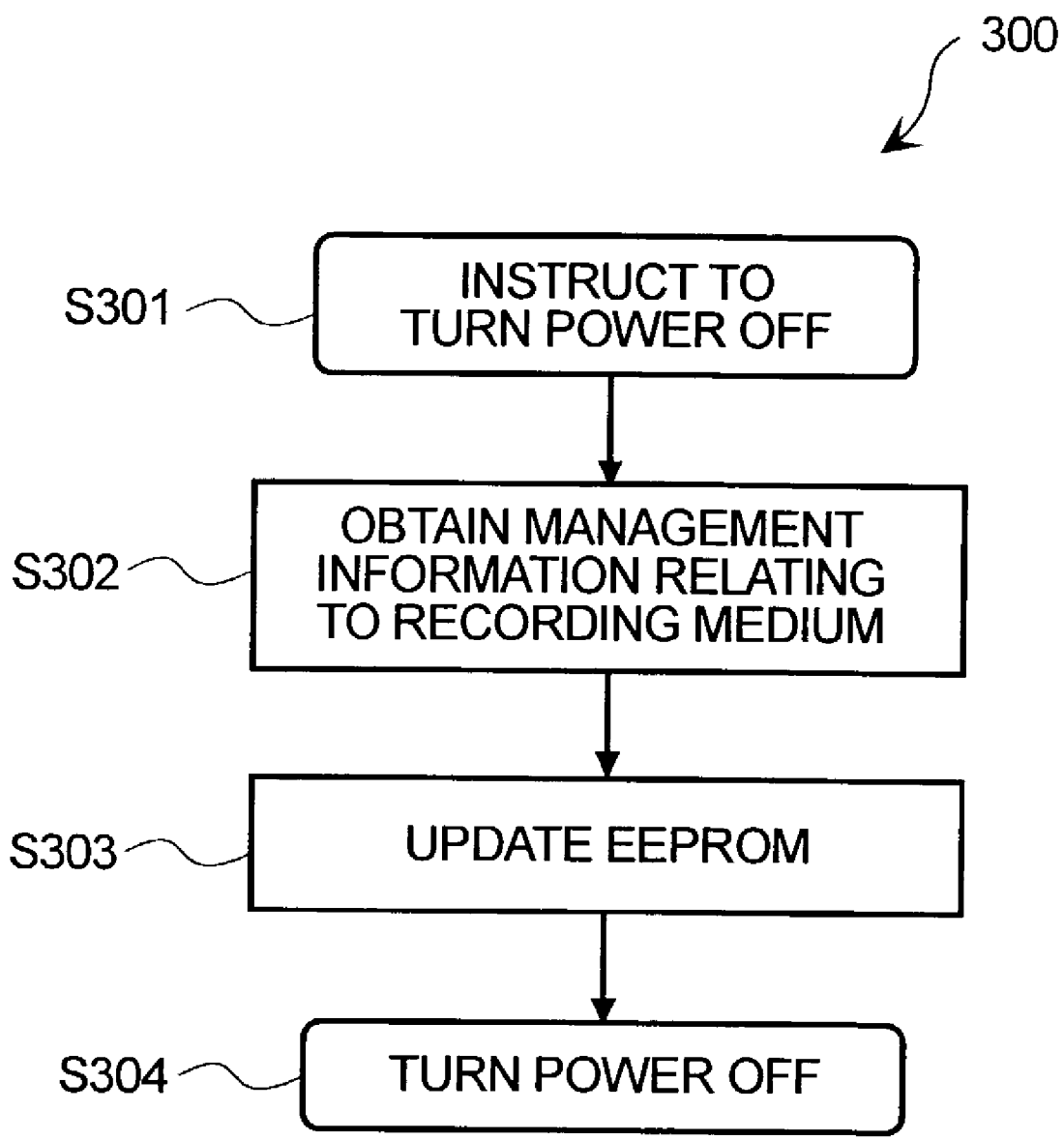

INFORMATION RECORDING APPARATUS AND INFORMATION RECORDING METHOD

CROSS-REFERENCES TO RELATED APPLICATIONS

The present application is related to and claims priority from Japanese Patent Application No. 2002-102018, filed on Apr. 4, 2002.

BACKGROUND OF THE INVENTION

The present invention relates to a technique for recording information on an optical disk apparatus, and particularly to a technique for performing a recognition process prior to recording information on an optical disk.

A typical multiple format information recording apparatus, wherein an optical disk such as a DVD-RAM (Digital Versatile Disc-Random Access Memory) is used as a recording medium, performs a recognition process or processing. The recognition process involves, for example, determination of disk type, file system check, focusing servo, tracking servo, and testing laser power by performing a trial writing.

If a user tries to record information on the recording medium without the recognition process, he/she may waste time trying to record the information even though it is not possible to perform the recording function because the recording medium provided in the information recording apparatus is a read-only disk, on which information cannot be recorded. Even if the recording medium is capable of recording information thereon, the same problem may arise if the recording medium is write-protected. Further, similar problem arises if a recording medium that is capable of recording information does not have sufficient memory space to record all the information to be recorded.

If the user tries to record information on the recording medium on which information cannot be recorded as mentioned above, the information that has been recorded on the recording medium may be damaged. Therefore, information recording function is suspended until completion of the recognition process according to a conventional technology.

The time required for the recognition processing may last as long as dozens of seconds, depending on performance of the information recording apparatus and its software. While waiting for the completion of the recognition process, the user may fail to record a desired event. For example, where the recording apparatus is a DVD camcorder, the user may fail to record a very interesting live event while waiting for the recognition process to be completed. In addition, the user generally likes to record information as soon as possible, so even if the recognition processing time is shortened to be 7 to 8 seconds, the user may still find it inconvenient to wait for the recognition process to be completed.

The wait for even several seconds are particularly inconvenient in the case of portable devices, e.g., cameras or camcorders, that are battery operated. The user generally turns the portable device off when it is not being used to conserve battery time. This may happen a dozen times or more in a day. In such a case, the user is likely to find that waiting even 7 or 8 seconds is too long.

Japanese Patent Laid-open No. 8-125961 discloses one of the techniques for recording information using a camcorder on a primary recording tape medium during the recognition processing. In this publication, information is temporarily recorded on a memory while the camcorder is performing a recognition process after being turned on. The information that had been temporarily stored in the memory is transferred to the primary recording medium (i.e., the recording tape) after the recognition process has been completed.

However, the information recording apparatus does not determine whether or not it is possible to record information on the recording medium. Accordingly, the recording apparatus would attempt to record information to the recording medium even if it is write-protected or has insufficient memory space.

BRIEF SUMMARY OF THE INVENTION

An embodiment of the present invention relates to a recording technique for recording information during the recognition process shortly after the recording apparatus is turned on.

In one embodiment, the recording apparatus includes a non-volatile memory device for storing management information relating to a recording medium. The management information is retrieved and stored in the non-volatile memory when the recording medium is initially inserted into the apparatus. The management information is maintained in the non-volatile memory when the apparatus is turned off, so that this management information may be used to quickly check whether the recording medium is a suitable medium for recording information when the apparatus is turned on again. Also, desired information may be temporarily recorded in a secondary memory space while recognition processing is being performed to determine whether or not it is possible to record information on the recording medium.

Since the time required for reading out the management information (i.e., in the non-volatile memory) relating to the recording medium is shorter than that required for reading out the information relating to the recording medium which is recorded on the recording medium (i.e., the recognition process), it is possible to judge whether or not information can be recorded on the recording medium before the completion of the recognition processing. Thus, it is possible to record information into the secondary memory prior to the completion of the recognition process and receipt of a permission to record information on a recording medium is granted.

In one embodiment, an information recording apparatus includes a recording medium receiver to receive a recording medium whereon information may be recorded by the apparatus and a non-volatile memory to store management information about the recording medium provided in the recording medium receiver. The management information provides information about whether or not data can be recorded on the recording medium.

In another embodiment, an optical disk apparatus includes a receiver to receive an optical disk; a non-volatile memory space to store management information about the optical disk, the management information providing information about whether or not information can be recorded on the optical disk; a microprocessor to retrieve the management information by accessing the optical disk and store the retrieved management information to the non-volatile memory space; and a memory device to record information therein while the apparatus is not ready to record information on the optical disk.

In another embodiment, a method for operating an information recording apparatus includes retrieving management information relating to a recording medium provided in the recording apparatus. The management information is stored in a non-volatile memory. The management information provides information on a condition relating to recording video information to the recording medium.

In another embodiment, a method for operating an optical disk apparatus includes performing a recognition process upon turning on the apparatus; recording image data into a temporary memory space while performing the recognition process; and determining whether or not image data can be recorded on an optical disk provided in the apparatus using management information stored in a non-volatile memory device.

In yet another embodiment, a digital versatile disc (DVD) apparatus includes a receiver to receive a DVD disk; a non-volatile memory to store management information about the DVD disk, the management information providing information about whether or not image information can be recorded on the DVD disk; a microprocessor to retrieve the management information by accessing the DVD disk and store the retrieved management information in the non-volatile memory; and a semiconductor memory device to record image information therein while the apparatus is performing a recognition process, wherein the image information stored in the semiconductor memory device is transferred to the DVD disk after completing the recognition process using the DVD disk.

BRIEF DESCRIPTION OF THE DRAWINGS

FIG. 2 is a flowchart showing a flow of processing to be performed during a period from when a recording medium 107 is inserted into the information recording apparatus 1 to when a permission to record information on the recording medium 107 is granted according to one embodiment of the present invention.

FIG. 3 is a flowchart showing a flow of processing to be performed by the information recording apparatus 1 when the power thereof is turned off according to one embodiment of the present invention.

DETAILED DESCRIPTION OF THE INVENTION

An embodiment of the present invention will be described below. In the present embodiment, the information recording apparatus is described as a camcorder for recording still or moving pictures taken on a disk-like recording medium such as a DVD-RAM disk or a DVD-R disk, or a video recorder for recording TV programs and so forth on a disk-like recording medium. However, the present invention is applicable to other types of information recording apparatuses, as will be understood by those skilled in the art.

Figure 1:
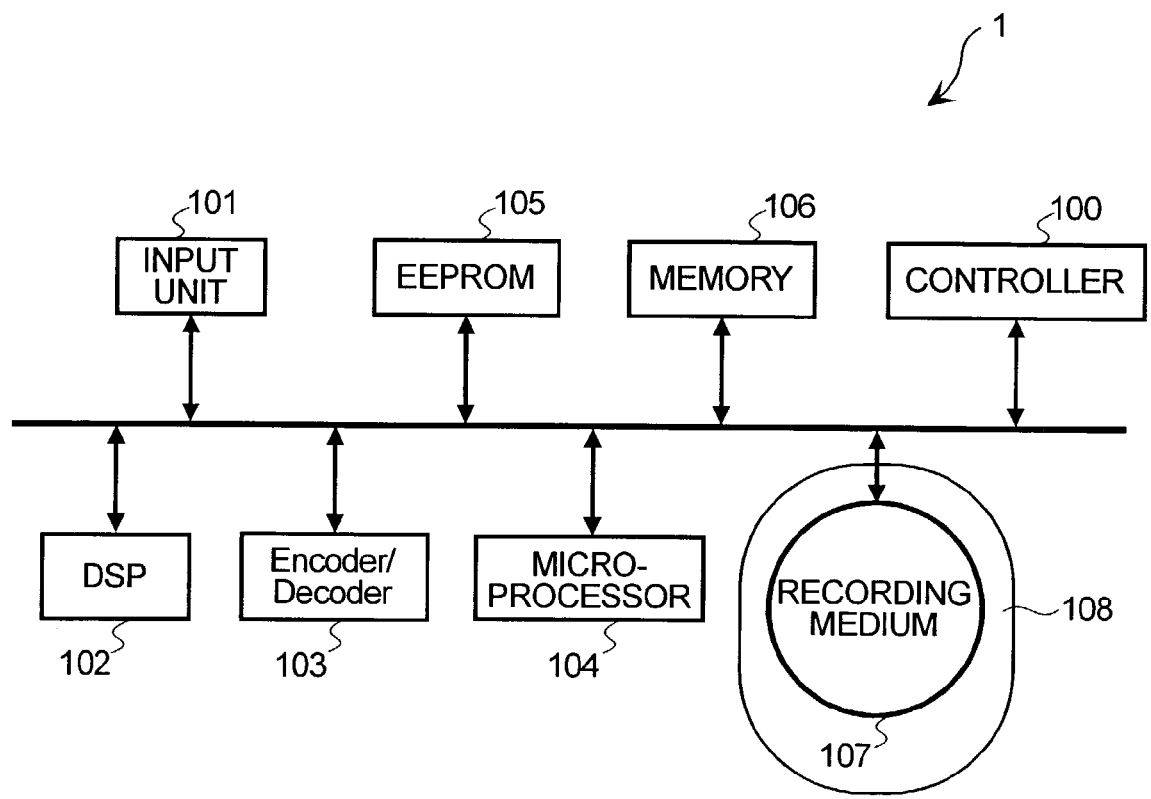
FIG. 1 is a block diagram showing an information recording apparatus 1 according to one embodiment of the present invention.

FIG. 1 is a block diagram showing an information recording apparatus 1 according to the present embodiment.

A user performs operations such as a start of recording or stop of recording by the use of a controller 100. In an input unit 101, optical signals are converted into analog electric signals by a CCD (Charge Coupled Device), and then the analog signals are converted into digital information by an A/D converter to be outputted. In the case where the information recording apparatus 1 is a video recorder, digital information such as those of a TV program is outputted from the input unit 101. A DSP (Digital Signal Processor) 102 converts the digital information outputted from the input unit 101 into image information having a suitable format, such as the DVD video recording specification or DVD video specification, or the like. Also, the DSP 102 converts decoded information, which has been decoded by an encoder/decoder 103, into image information corresponding to a format such as NTSC, which is a format used by one of TV broadcasting systems, at the time of reproducing information. The Encoder/decoder 103 generates a data stream by subjecting the image information which has been converted by the DSP 102 to MPEG (Moving Picture Expert Group) compression at the time of recording information, and decodes a stream which is read out from a recording medium 107, e.g., an optical disk such as a DVD-RAM, DVD-R, or DVD-RW, at the time of reproducing information. As used herein, a DVD disk is any optical disk compatible with any DVD format. The recording medium 107 is the primary recording medium in the recording apparatus. The recording medium 107 is provided in a receiver 108 of the apparatus.

A microprocessor 104 controls the overall functions of the information recording apparatus 1. Also, the microprocessor 104 determines whether or not it is possible to record information on the recording medium 107, which is provided in the information recording apparatus 1. The microprocessor 104 packetizes the stream, which has been compressed by the encoder/decoder 103 in accordance with a relevant format or standard when so required. In the present embodiment, the packetizing is in accordance with the DVD video recording specification or the DVD video specification.

A non-volatile memory 105, e.g., an EEPROM (Electrically Erasable Programmable Read-Only Memory), stores management information relating to the recording medium or disk provided in the recording apparatus even when the power is turned off. The non-volatile memory or EEPROM 105 stores management information relating to the recording medium or disk 107 provided in the recording apparatus, e.g., a DVD camcorder. The management information includes one or more of the following information: (1) information indicating whether or not the recording medium 107 is a recordable medium, (2) information indicating whether or not the recording medium 107 has been write-protected, (3) information indicating whether or not the recording medium 107 is a rewritable disk, and (4) information indicating an amount of memory space available for recording in the recording medium 107.

A memory 106 stores a data stream that has been compressed or encoded by the encoder/decoder 103 or a data stream packetized by the microprocessor 104. The encoder/decoder 103 is not required where it is unnecessary to compress the information to be recorded or reproduce the compressed information. The encoder/decoder 103 is also not necessary for storing information that has been converted by the DSP 102 in the memory 106. The memory 106 is a secondary recording medium in the recording apparatus to temporarily store information while it is not possible to store information to the primary recording medium 107. The memory 106 could be a dynamic random access memory (DRAM) or a non-volatile memory, such as EEPROM.

Operations of the information recording apparatus 1 for recording information will be described with reference to FIG. 1.

A user can give instructions for recording by operating the controller 100. After receiving the instructions for recording via the controller 100, the microprocessor 104 controls the information recording apparatus 1 in order to record the information if it determines that the information may be recorded on the medium 107. This determination is based on the management information relating to the recording medium 107 obtained through the recognition processing or by accessing the EEPROM 105.

The DSP 102 performs various processing on the digital information received from the input unit 101 to generate image information. The process performed includes dividing the digital information into luminance and chrominance signals and performing a format conversion for a subsequent the MPEG compression step. The encoder/decoder 103 then performs the MPEG compression on the image information outputted by the DSP 102 to generate a data stream. The encoder/decoder 103 also receives audio information from a microphone or external input terminal (not shown) in parallel with the image information from the DSP 102, so that the audio information can be associated with the image information. The audio information is also compressed for this purpose, thereby generating an audio data stream, e.g., MPEG-AUDIO, Dolby digital or non-compressed LPCM stream. Although the compression method adopted in the present embodiment is the MPEG compression in conformity with the DVD video recording specification or the DVD video specification since the recording medium used for the present embodiment is the DVD-RAM or the DVD-R, other compression methods may be used in accordance with the specification of the recording medium.

The streams of the video and audio information generated are packetized in accordance with a suitable standard and multiplexed by the microprocessor 104. The multiplexed program streams ("PS") are temporarily stored in the memory 106, and then subsequently transferred to the recording medium 107 if an amount of the stored information exceeds a threshold value. In addition, the microprocessor 104 usually transfers continuously the PSs that have been stored in the memory 106 to the recording medium 107; however, the PSs may be transferred to the medium 107 intermittently to reduce the power consumption.

Although the microprocessor 104 controls the entire information recording apparatus 1 as described above with reference to FIG. 1, it is possible to use a plurality of microprocessors to provide each microprocessor with dedicated functions when so required. Although the EEPROM 105 and the memory 106 are illustrates as separate memories in the present embodiment, a single memory device may be used to perform the functions of the both memory devices 105 and 106.

FIG. 2 is a flowchart showing a process 200 performed during a period from when the recording medium 107 is inserted into the information recording apparatus 1 to when a permission to record information to the recording medium 107 is granted by the microprocessor according to one embodiment of the present invention. The process 200 describes the steps performed when the information recording apparatus 1 is turned off with the recording medium 107 left therein and then turned on again subsequently.

When the recording medium 107 is inserted into the information recording apparatus 1 (Step S201), the microprocessor 104 performs the recognition processing for the recording medium 107 in order to confirm the state of the recording medium 107 (Step S202). As described above, the recognition processing means a series of processing steps performed, so as to bring about a recording state to permit information to be recorded on the recording medium. The recognition process involves determining the disk type, focus servo, tracking servo, and other servo controls, checking file system, and learning of laser power by trial writing. The time required to complete the recognition processing can be from few seconds to dozens of seconds.

Next, the microprocessor 104 obtains information relating to the recording medium 107 from among various information obtained by the recognition processing (Step S203). As described above, the management information relating to the recording medium includes at least one of the following: (1) information indicating whether or not the recording medium 107 is a recordable recording medium, (2) information indicating whether or not the recording medium 107 is a write-protect disk, (3) information indicating whether or not the recording medium 107 is a rewritable disk, and (4) information indicating an amount of space in the recording medium 107. The information relating to the write-protection of the recording medium 107 may be recorded on the recording medium itself, or obtained from a cartridge when the recording medium 107 is inserted into the cartridge. For example, a semiconductor chip may be attached to the cartridge to store such management information.

Then, the microprocessor 104 stores the management information relating to the recording medium 107 in the EEPROM 105 (Step S204). Since the EEPROM 105 retains recorded information even if the power is turned off, the microprocessor 104 can retrieve the stored management information from the EEPROM 105 when the recording apparatus is subsequently turned off and turned on again.

Execution of the processing shown in FIG. 2 brings about the recordable state permitting information to be recorded on the recording medium 107. The recording apparatus 1 then waits for instructions from the controller 100 (Step S205). When an instruction to record is received from the controller 100, information is recorded on the recording medium 107 in accordance with the process described above.

FIG. 3 is a flowchart showing a process 300 performed by the information recording apparatus 1 when the power is turned off.

When an instruction to turn off the power is received from the controller 100 (Step S301), the microprocessor 104 retrieves management information relating to the recording medium 107 before turning off the power (Step S302).

Then, the microprocessor 104 stores the management information obtained in Step S301 ("updated management information") to the EEPROM 105 (Step S303). The management information, stored in the EEPROM 105, which no longer accurately reflects the most recent state of the recording medium 107 is updated at this time. One such management information is the information relating to an amount of available recording space in the recording medium. For example, if the available recording space was 100 MB at the time the recording apparatus was turned on and 60 MB has been used prior receiving the "turn-off" command at the step S301, the information relating to the amount of available recording space is updated as 40 MB (100 MB-60 MB=40 MB). Upon updating the management information, the information recording apparatus 1 is turned off (Step S304).

The microprocessor 107 can use the management information stored in the EEPROM 105 to more promptly determine whether or not information may be recorded on the recording medium prior to completion of the recognition process, which generally requires longer time to complete. For example, an optical disk camcorder requires about 20 seconds to complete an initial recognition process, corresponding to the step S202, when the optical disk is first inserted therein. If the camcorder is turned off and turned on with the same optical disk therein, a subsequent recognition process is completed in about 10-15 seconds. However, the management information stored in the EEPROM 105 may be used to determine whether or not information can be recorded on the recording medium in about 5 seconds or less, thereby eliminating about 10 seconds of wait time, as explained in more detail below.

It is desirable to know whether or not it is possible to record information on the recording medium prior to recording information thereto. For example, if the information recorded on the recording medium 107 is not readable or rewritable due to a problem such as damage to its administration information which manages the information, the state of recording information on the recording medium 107 cannot be achieved unless the read and write states are restored when the power is turned on again. Also, if the insufficient amount of recordable memory space remains in the recording medium, e.g., less than a predetermined threshold amount of free memory remains, information may not be recorded on the recording medium 107 when the power is turned on again. In the present embodiment, the microprocessor 104 can make such determination prior to the completion of the recognition processing for the recording medium 107 using the management information stored in the EEPROM 105.

Figure 4A:
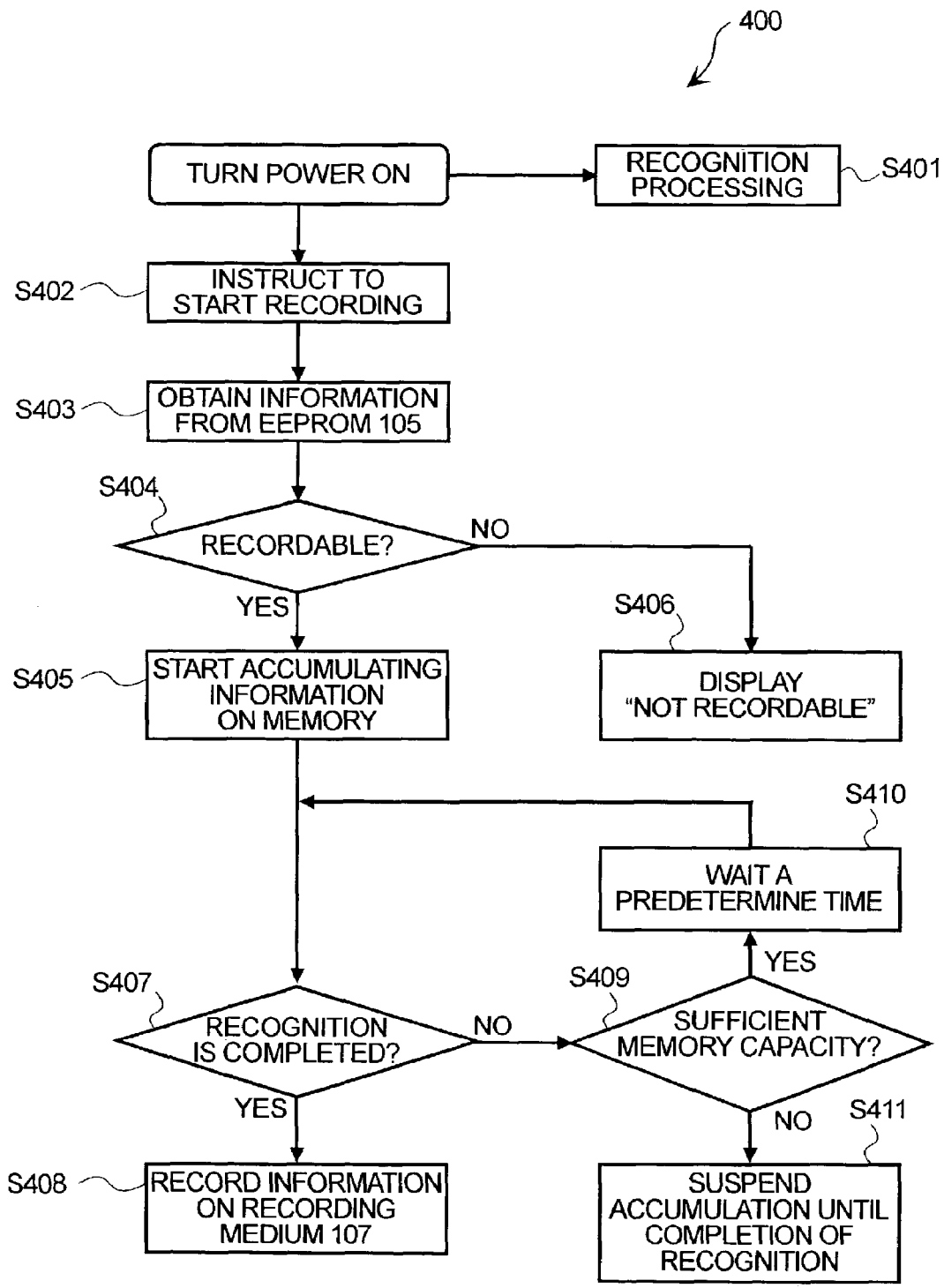
FIG. 4A is a flowchart showing a flow of processing to be performed by the information recording apparatus 1 when the information recording apparatus receives a command to start recording from a user immediately after power is supplied according to one embodiment of the present invention.

FIG. 4A is a flowchart showing a process 400 performed by the information recording apparatus 1 when it receives a command from a user to start recording immediately after the apparatus is turned on. The process 400 is based on the premise that the power of the information recording apparatus 1 is turned off with the recording medium 107 therein.

The microprocessor 104 initiates the above-described recognition processing for the recording medium 107 when the power is supplied (Step S401). The flow of the processing is substantially identical as shown in FIG. 2. In turn, if an instruction to start recording information is received from the controller 100 while the recognition process is proceeding (Step S402), the microprocessor 104 retrieves the management information (updated management information) relating to the recording medium 107 from the EEPROM 105 (Step S403).

Then, using the management information, the microprocessor 104 determines whether or not it is possible to record information on the recording medium 107 (step S404). As described above, it takes a several seconds to dozens of seconds to complete the recognition process and determine whether or not information can be recorded on the recording medium. However, a relatively prompt determination of the recordability on the recording medium can be made using the management information stored in the EEPROM 105.

If it is determined that the recording is possible at step S404, the information recording apparatus 1 starts to record information in the memory 106 via the input section 101, the DSP 102 and the encoder/decoder 103 (step S405) for temporary storage. On the other hand, if it is determined that the recording is not possible to the recording medium 107, the recording apparatus 1 displays an indication that the recording to the recording medium is not possible (Step S406). In camcorder, such an indication is displayed on a monitoring screen (not shown) or a finder (not shown). In a video recorder, such information is displayed on a display panel (not shown) or a display (not shown). Alternatively, such an indication may not be displayed under certain implementations.

In one embodiment, an indication requesting insertion of another recording medium is displayed by the recording apparatus. At the same time, desired information is stored on the memory 106, so that this information may be transferred to the new recording medium once it is inserted into the apparatus.

After a predetermined time, the microprocessor 104 determines whether or not the recognition processing of step S401 has been completed, for example, from the time information is first stored in the memory 106. (Step S407). Alternatively, this determination may be done when the information stored in the memory 106 exceeds a predetermined storage amount. It should be noted that the predetermined period and the predetermined amount are set depending on the time required for the recognition processing for the recording medium 107. The predetermined period may preferably be no less than the shortest time required to complete the recognition process. The predetermined storage amount preferably is the amount of information that can be stored in the memory within the shortest time required to complete the recognition process. The capacity of the memory 106 preferably is larger than the predetermined amount. For example, if a rate of transferring information to the memory 106 is 3 to 6 Mbps and the time required for the recognition is about 20 seconds, the predetermined time is preferably at least 20-second long, and the predetermined storage amount is at least 15 MB (6 Mbps×20 seconds). Accordingly, the capacity of the memory 106 should be 15 MB or more.

Since the recognition processing has been already completed at the time the step S407 is reached if the predetermined period and the predetermined amount are appropriately set, a normal recording state (Step S408) is provided and the information stored in the memory 106 is transferred to the recording medium 107.

In one embodiment, if the recording of information continues as the recognition process is completed in the step S408, then the information is continuously recorded in the memory 106 while the information already stored in the memory 106 is being transferred to the recording medium 107. That is, the memory 106 serves as a buffer, so that the desired information may be recorded continuously without interruption.

In another embodiment, the desired information is recorded directly to the recording medium 107, but an appropriate amount of storage space in the recording medium 107 is reserved. Subsequently, after the completion of the recording operation, the apparatus then transfers the information that had initially been stored in the memory 106 to the reserved memory space, thereby preserving temporal sequence of the recorded information.

Under certain circumstances, the recognition processing time may not be completed by the recognition process completion checking step S407. If so, the microprocessor determines if the memory 106 has additional memory space available to record more information therein (step S409). If the memory 106 has additional capacity, a predetermined amount of time is waited (step S410), and the process 400 is returned to the step S407. At this point, the microprocessor determines again if the recognition process has been completed. If the microprocessor determines that the recognition process has been completed, then the normal recording operation is resumed, as explained above.

Otherwise, the microprocessor once again determines whether or not there is additional storage capacity in the memory 106 (step S409). If the there is additional capacity, the above steps S409 and S410 are repeated. If there is no additional (or insufficient) storage capacity, the information storage operation in the memory 106 is temporarily stopped (step S411). Then, the recording is restarted at the time when the completion of the recognition processing is confirmed. In addition, it is possible to overwrite new information on old information in the memory 106 in place of temporality stopping the accumulation of information in the memory 106. Both of the above methods can readily be realized.

Figure 4B:
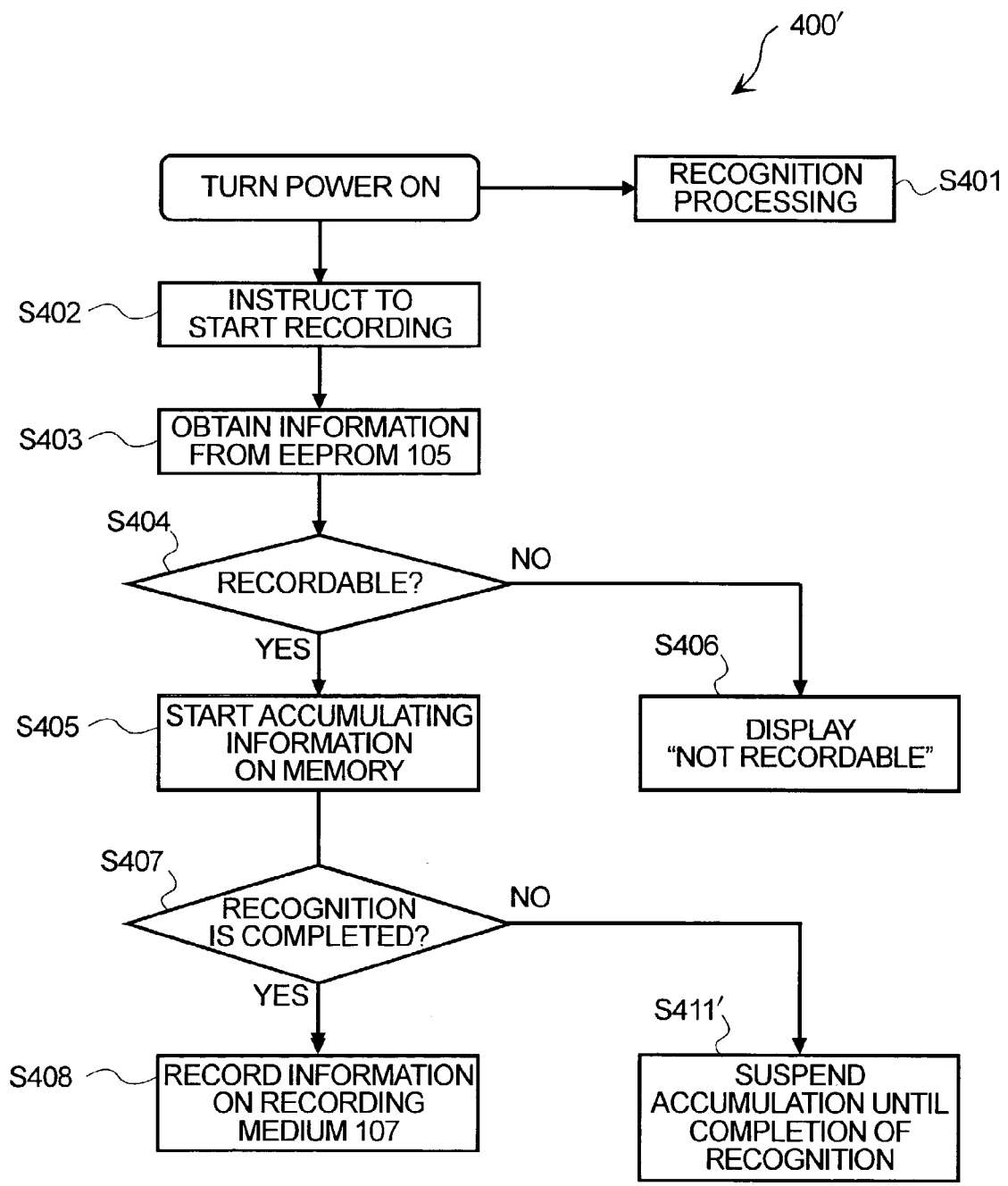
FIG. 4B is a flowchart showing a flow of processing to be performed by the information recording apparatus 1 when the information recording apparatus receives a command to start recording from a user immediately after power is supplied according to another embodiment of the present invention.

In one embodiment, in a process 400', the memory storage capacity and the recognition completion check step S407 are configured, so that the step S407 is performed at about the time when all of the memory storage capacity has been used to record the desired information (FIG. 4B). In such a case, the process 400 proceeds from the step S407 to the step S411 directly to suspend the recording operation until the recognition process is completed. That is, the steps S409 and S410 are not required in such an embodiment.

According to the above-described processing, it is thus possible to record information that is obtained during the interval between the time when the power is turned on to the time when the permission to record information on the recording medium is granted. The information recorded during this interval is temporarily stored in a temporary storage location, and the recording on the recording medium (primarily storage) is performed upon receipt of a permission to record information on the recording medium. Accordingly, it is possible to avoid attempting to record information on a recording medium that cannot or is not ready to record the information, thereby preventing damages to the information recorded on the recording medium.

In the present embodiment, it is described that the recognition processing in step S401 is the same as that performed in FIG. 2. However, since the information relating to the recording medium 107 is retained in the EEPROM 105, it is possible to shorten the time required for the recognition processing in step S401 by obtaining the information from the EEPROM 105, rather than from the recording medium 107. Owing to the shortened time for the recognition processing, it is possible to reduce the predetermined period and the predetermined amount, as well as replace the memory 106 with that having a smaller capacity. In one implementation, the time required for the recognition processing can be shortened from about 20 seconds (FIG. 2) to about 7 to 8 seconds (step S401). Therefore, the predetermined period can be set to 8 seconds at the longest and the predetermined amount can be set to 6 MB (6 Mbps×8 seconds) according to one embodiment of the present invention. Thus, the capacity of the memory 106 should be at least 6 MB in this embodiment.

Also, in the present embodiment, it is determined whether or not the recording medium 107 can record information in Step S404. However, it is also possible to perform the determination step in S302 of FIG. 3, so that the EEPROM 105 retains the determination result in Step S303. Since such modification can shorten the time it takes for Steps S403 and S404, the predetermined period and the predetermined amount can be reduced by the shortened time, and the memory 106 may be replaced with that having even smaller capacity.

According to the present invention, it is possible to record, on the recording medium, information, which is obtained during a period from when the power is turned on to when a state permitting to record information on the recording medium is brought about.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. An information recording apparatus for recording information on a recording medium comprising:

a non-volatile memory which retains information relating to the recording medium even if the power is turned off;

a judgment module which judges whether or not it is possible to record information on the recording medium based on the information relating to the recording medium which is retained in the non-volatile memory before completing recognition processing which makes the state of the recording apparatus ready for recording information on the recording medium based on information read from the recording medium; and a memory device which accumulates information to be recorded on the recording medium;

wherein the recording apparatus records information accumulated in the memory device to the recording medium after performing recognition processing when turning on the recording apparatus or inserting the recording medium to the recording apparatus, and wherein, if the judgment module judges that it is possible to record information on the recording medium based on the information relating to the recording medium which is retained in the non-volatile memory, the information recording apparatus starts accumulating information in the memory device before the recognition processing is complete.

2. The information recording apparatus according to claim 1, wherein the information relating to the recording medium includes at least one of information indicating a type of the recording medium, information indicating whether the recording medium is write-protected, and information indicating an amount of space in the recording medium.

3. The information recording apparatus according to claim 1, wherein information is not accumulated in the memory device in the cases where the recording medium is a read-only disk, the recording medium is a write-protected disk, and an amount of space in the recording medium is smaller than an amount of information that can be accumulated in the memory device.

4. The information recording apparatus according to claim 1, wherein an indication that information cannot be recorded is displayed in the cases where the recording medium is a read-only disk, the recording medium is a write-protected disk, and an amount of space in the recording medium is smaller than an amount of information that can be accumulated in the memory device.

5. The information recording apparatus according to claim 1, wherein an indication that another recording medium should be inserted is displayed on a display module, and the information which is accumulated in the memory device is recorded on the another recording medium after insertion of the another recording medium in eases where the recording medium is a read-only disk, the recording medium is a write-protected disk, and an amount of space in the recording medium is smaller than an amount of information that can be accumulated in the memory device.

6. The information recording apparatus according to claim 1, wherein information-recording is suspended until the recognition processing is completed when the recognition processing does not complete after a lapse of time equivalent to the amount of information that can be accumulated in the memory device.

7. The information recording apparatus according to claim 1, wherein, after the power is turned off with the recording medium being inserted into the information recording apparatus and the power is turned on again, the judgment module judges whether or not it is possible to record information on the recording medium based on the information relating to the recording medium which has been retained in the non-volatile memory.

8. The information recording apparatus according to claim 1, wherein the judgment module judges whether or not it is possible to record information on the recording medium based on the information relating to the recording medium which had been retained in the non-volatile memory before the power is turned off with the recording medium being inserted into the information recording apparatus.

9. An information recording apparatus which does not record information on a recording medium during a period from when the power is turned on to when recognition processing which brings about a state permitting information to be recorded on the recording medium is completed, comprising:
a memory device which accumulates information therein; and
a non-volatile memory which retains information relating to the recording medium even if the power is turned off;
wherein, depending on the information relating to the recording medium which is retained in the non-volatile memory, the information recording apparatus accumulates information in the memory device during the recognition processing and records the information accumulated in the memory device on the recording medium when the recognition processing has been completed, or displays an indication that information cannot be recorded on the recording medium.

10. The information recording apparatus according to claim 9, wherein the information relating to the recording medium includes at least one of information indicating a type of the recording medium, information indicating whether the recording medium is a write-protected disk, and information indicating an amount of space in the recording medium.

11. An information recording method of an information recording apparatus comprising the steps of:
retaining information relating to a recording medium in a non-volatile storage of the recording apparatus;
initiating a recognition process to place the recording apparatus in a state in which information can be recorded on the recording medium, wherein information is not recorded on the recording medium during the recognition process;
accumulating information while performing the recognition process;
judging whether or not it is possible to record information on the recording medium based on the information relating to the recording medium retained in the non-volatile storage; and
after the recognition process is complete, recording information to the recording medium, including the information accumulated during the recognition process, if it is judged possible to record on the recording medium.

12. The information recording method according to claim 11, wherein the information relating to the recording medium includes at least one of information indicating a type of the recording medium, information indicating whether the recording medium is a write-protected disk, and information indicating an amount of space in the recording medium.

13. The information recording method according to claim 11, wherein information is not accumulated in the cases where the recording medium is a read-only disk, the recording medium is a write-protected disk, and an amount of space in the recording medium is smaller than an amount of information that can be accumulated in the memory device.

14. The information recording method according to claim 11, wherein an indication that information cannot be recorded is displayed on a display module in the cases where the recording medium is a read-only disk, the recording medium is a write-protected disk and an amount of space in the recording medium is smaller than an amount of information that can be accumulated in the memory device.

15. The information recording method according to claim 11, wherein an indication that another recording medium should be inserted is displayed on display module, and the information which is accumulated is recorded on the another recording medium after insertion of the another recording medium in the cases where the recording medium is a read-only disk, the recording medium is a write-protected disk, and an amount of space in the recording medium is smaller than an amount of information that can be accumulated.

16. The information recording method according to claim 11, wherein information-recording is suspended until the recognition processing is completed when the recognition processing does not complete after a lapse of period equivalent to the amount of information that can be accumulated.

17. The information recording method according to claim 11 wherein, after the power is turned off with the recording medium being inserted into the information recording apparatus and the power is turned on again, the judgment module judges whether or not it is possible to record information on the recording medium based on the information relating to the recording medium which has been retained.

18. The information recording method according to claim 11, wherein the judgment module judges whether or not it is possible to record information on the recording medium based on the information relating to the recording medium which had been retained before the power is turned off with the recording medium being inserted.

19. A method of recording information to an optical disk, comprising:
performing a recognition process in which an information recording device identifies the optical disk before information can be recorded thereon;
accumulating information to be recorded on the optical disk while the recognition process is performed;
retrieving information about the optical disk from a non-volatile memory of the information recording device;
determining a recording status of the optical disk based upon the information relating to the optical disk retrieved from the non-volatile memory; and
recording the accumulated information to the optical disk after the recognition process is complete if the recording status indicates that information can be recorded on the optical disk.

* * * * *